US006502034B1

(12) United States Patent
Miller

(10) Patent No.: US 6,502,034 B1
(45) Date of Patent: Dec. 31, 2002

(54) METHOD AND APPARATUS FOR ACTIVATING A CRASH COUNTERMEASURE USING A TRANSPONDER AND ADAPTIVE CRUISE CONTROL

(75) Inventor: Ronald Hugh Miller, Saline, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,835

(22) Filed: Feb. 21, 2002

(51) Int. Cl.[7] .......................... G01S 13/93; G08G 1/16

(52) U.S. Cl. ...................... 701/301; 701/213; 340/903

(58) Field of Search .......................... 701/45, 93, 96, 701/213, 301; 342/47, 70, 71, 357.06, 357.08; 340/436, 902, 903; 180/167, 169

(56) References Cited

U.S. PATENT DOCUMENTS

| | | | | | |
|---|---|---|---|---|---|
| 4,684,949 | A | | 8/1987 | Kalafus | |
| 4,706,086 | A | | 11/1987 | Panizza | |
| 5,068,654 | A | * | 11/1991 | Husher | 180/167 |
| 5,387,916 | A | * | 2/1995 | Cohn | 342/44 |
| 5,428,544 | A | | 6/1995 | Shyu | |
| 5,506,584 | A | | 4/1996 | Boles | |
| 5,510,794 | A | | 4/1996 | Asbury et al. | |
| 5,546,311 | A | | 8/1996 | Sekine | |
| 5,572,449 | A | * | 11/1996 | Tang et al. | 180/170 |
| 5,589,827 | A | | 12/1996 | Scurati | |
| 5,952,959 | A | | 9/1999 | Norris | |
| 6,026,347 | A | | 2/2000 | Schuster | |
| 6,112,152 | A | | 8/2000 | Tuttle | |
| 6,161,071 | A | | 12/2000 | Shuman et al. | |
| 6,223,117 | B1 | | 4/2001 | Labuhn et al. | |
| 6,236,337 | B1 | | 5/2001 | Beier et al. | |
| 6,313,758 | B1 | * | 11/2001 | Kobayashi | 340/436 |
| 2002/0003488 | A1 | * | 1/2002 | Levin et al. | 342/70 |

* cited by examiner

*Primary Examiner*—Michael J. Zanelli
(74) *Attorney, Agent, or Firm*—Frank A. MacKenzie

(57) ABSTRACT

A method for operating a pre-crash sensing system 10 for a first vehicle (11) proximate a second vehicle (72). The second vehicle (72) generates a cruise control signal. The cruise control signal is detected at the first vehicle. In response to the cruise control signal a vehicle data signal from the first vehicle is generated. The first vehicle data signal may include various information from the first vehicle including sensor data, heading data, and vehicle classification data. The transponder of the first vehicle may also be activated in response to an urgent event. The data signal is formed in response to the urgent event and broadcast from the first vehicle to all nearby vehicles.

17 Claims, 12 Drawing Sheets

METHOD AND APPARATUS FOR ACTIVATING A CRASH COUNTERMEASURE USING A TRANSPONDER AND ADAPTIVE CRUISE CONTROL

CROSS REFERENCE TO RELATED APPLICATIONS

The present invention is related to U.S. applications Ser. No. 09/683,590 entitled "Method and Apparatus for Activating a Crash Countermeasure Using A Transponder Having Various Modes Of Operation" and Ser. No. 09/683,637 entitled "Method and Apparatus for Activating a Crash Countermeasure" filed simultaneously herewith and hereby incorporated by reference.

BACKGROUND OF INVENTION

1. Technical Field

The present invention relates to pre-crash sensing systems for automotive vehicles, and more particularly, to pre-crash sensing systems having countermeasures operated in response to pre-crash detection.

2. Background

Auto manufacturers are investigating radar, lidar, and vision-based pre-crash sensing systems to improve occupant safety. Current vehicles typically employ accelerometers that measure forces acting on the vehicle body. In response to accelerometers, airbags or other safety devices are employed. Also, Global Position Systems (GPS) systems are used in vehicles as part of navigation systems.

In certain crash situations, it would be desirable to provide information to the vehicle operator before forces actually act upon the vehicle. As mentioned above, known systems employ combinations of radar, lidar and vision systems to detect the presence of an object in front of the vehicle a predetermined time before an actual crash occurs. Such systems have expense and false positives.

Other systems broadcast their positions to other vehicles where the positions are displayed to the vehicle operator. The drawback to this type of system is that the driver is merely warned of the presence of a nearby vehicle without intervention. In a crowded traffic situation, it may be difficult for a vehicle operator to react to a crowded display.

It would be desirable to provide a system that takes into consideration the position of other vehicles and, should the situation warrant, provide crash mitigation.

SUMMARY OF INVENTION

The present invention provides an improved pre-crash sensing system that deploys a counter-measure in response to the position the object detected.

In one aspect of the invention, a method for operating a pre-crash sensing system for a first vehicle proximate a second vehicle said second vehicle generating a cruise control signal comprising:

detecting the cruise control signal at the first vehicle; and generating a vehicle data signal from the first vehicle in response to the cruise control signal.

In a further aspect of the invention, a method for communicating from a first vehicle comprising: sensing an urgent event at the first vehicle; and forming a first vehicle data signal from the first vehicle in response to the urgent event; and broadcasting the data signal from the first vehicle.

One advantage of the invention is that the cruise control signal will trigger only one of the vehicles" transponders. Thus, the orientation of the target vehicle may be easily determined.

Other aspects and features of the present invention will become apparent when viewed in light of the detailed description of the preferred embodiment when taken in conjunction with the attached drawings and appended claims.

DETAILED DESCRIPTION

Figure 1:
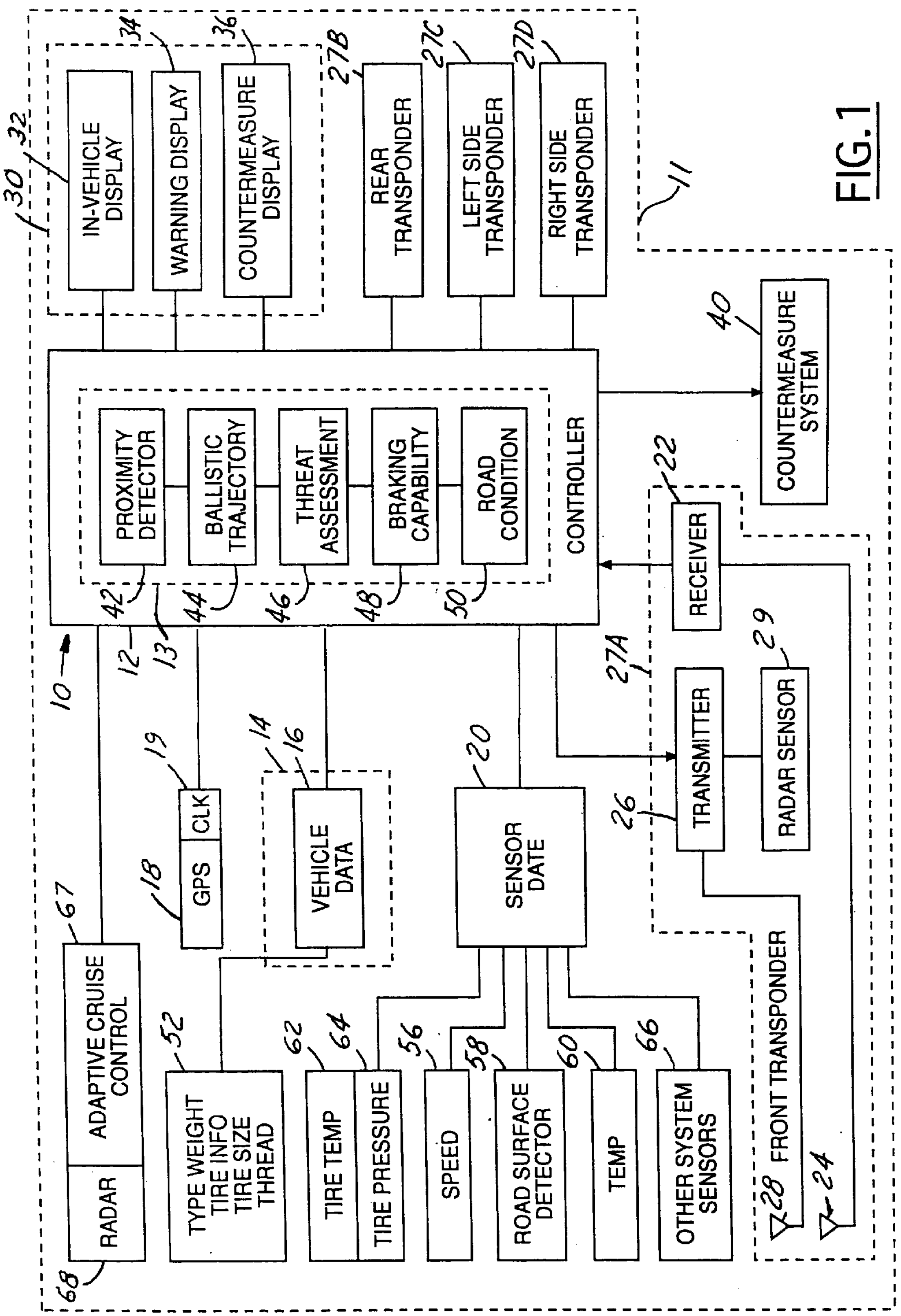
FIG. 1 is a block diagrammatic view of a pre-crash sensing system according to the present invention.

In the following figures the same reference numerals will be used to identify the same components in the various views.

Referring now to FIG. 1, a pre-crash sensing system 10 for an automotive vehicle 11 has a controller 12. Controller 12 is preferably a microprocessor-based controller that is coupled to a memory 14. Controller 12 has a CPU 13 that is programmed to perform various tasks. Memory 14 is illustrated as a separate component from that of controller 12. However, those skilled in the art will recognize that memory may be incorporated into controller 12.

Memory 14 may comprise various types of memory including read only memory, random access memory, electrically erasable programmable read only memory, and keep alive memory. Memory 14 is used to store various thresholds and parameters including vehicle data 16 as illustrated.

Controller 12 is coupled to a global positioning system 18 that receives position data triangulated from satellites as is known to those skilled in the art.

Controller 12 is coupled to a sensor data block 20 that represents various sensors located throughout the vehicle. The various sensors will be further described below.

Controller 12 may also be coupled to a receiver 22 coupled to a receiving antenna 24 and a transmitter 26 coupled to a transmitting antenna 28. Transmitter 26 and receiver 22 may be part of a transponder 27A. As illustrated, transponder 27A is located at the front of the vehicle 11. Preferably, vehicle has a transponder located on each of the four sides of the vehicle. That is, a rear transponder 27B is located at the rear of the vehicle, a transponder 27C is located on the left side of the vehicle and, a transponder 27D is located on the right side of the vehicle, A radar sensor 29 is located within each transponder. When a radar signal having a certain amplitude is detected, transmitter 26 generates a response that includes its location relative to the vehicle. Other data such as sensor data, position data, and other data may also be communicated. An appropriate radar signal is a cruise control signal from an active cruise control system.

Controller 12 is also coupled to a display 30 that may include various types of displays including a vehicle network display 32, a warning display 34, and a countermeasure display 36. Each of these displays will be described in further detail below. As should be noted, display 30 may be a single display with different display features or may be individual displays that may include audible warnings as well.

Controller 12 has various functional blocks illustrated within CPU 13. Although these functional blocks may be represented in software, they may also be illustrated in hardware. As will be further described below, controller 12 has a proximity detector 42 that is used to determine the proximity of the various vehicles around automotive vehicle 11. A vehicle trajectory block 44 is used to determine the trajectory of the vehicle and surrounding vehicles. Based upon the vehicle trajectory block 44, a threat assessment is made in functional block 46. Of course, threat assessment 46 takes into consideration various vehicle data 16 and sensor data from sensor block 20. Threat assessment 46 may be made based upon the braking capability of the present vehicle and surrounding vehicles in block 48 and also road conditions of the present vehicle and surrounding vehicles in block 50. As will be further described below, the road conditions of block 50 may be used to determine the braking capability in block 48.

In block 16, various vehicle data are stored within the memory. Vehicle data represents data that does not change rapidly during operation and thus can be fixed into memory. Various information may change only infrequently and thus may also be fixed into memory 14. Vehicle data includes but is not limited to the vehicle type, which may be determined from the vehicle identification number, the weight of the vehicle and various types of tire information. Tire information may include the tire size and type of tread. Such data may be loaded initially during vehicle build and may then manually be updated by a service technician should information such as the tire information change.

Global positioning system (GPS) 18 generates a position signal for the vehicle 11. Global positioning system 18 updates its position at a predetermined interval. Typical interval update periods may, for example, be one second. Although this interval may seem long compared to a crash event, the vehicle position may be determined based upon the last up update from the GPS and velocity and acceleration information measured within the vehicle.

Global positioning system 18 has a clock that is common to all GPS systems. Clock 19 provides a timing signal. Each of the GPS systems for different vehicles use the same clock and timing signal. As will be described below, the common clock for timing signal is used to synchronize the communication between the various vehicles of the system.

Sensor data 20 may be coupled to various sensors used in various systems within vehicle 11. Sensor data 20 may include a speed sensor 56 that determines the speed of the vehicle. Speed sensor may for example be a speed sensor used in an anti-lock brake system. Such sensors are typically comprised of a toothed wheel from which the speed of each wheel can be determined. The speed of each wheel is then averaged to determine the vehicle speed. Of course, those skilled in the art will recognize that the vehicle acceleration can be determined directly from the change in speed of the vehicle. A road surface detector 58 may also be used as part of sensor data 20. Road surface detector 58 may be a millimeter radar that is used to measure the road condition. Road surface detector 58 may also be a detector that uses information from an anti-lock brake system or control system. For example, slight accelerations of the wheel due to slippage may be used to determine the road condition. For example, road conditions such as black ice, snow, slippery or wet surfaces may be determined. By averaging microaccelerations of each tire combined with information such as exterior temperature through temperature sensor 60, slippage can be determined and therefore the road conditions may be inferred therefrom. Such information may be displayed to the driver of the vehicle. The surface conditions may also be transmitted to other vehicles.

Vehicle data 16 has a block 52 coupled thereto representing the information stored therein. Examples of vehicle data include the type, weight, tire information, tire size and tread. Of course, other information may be stored therein.

Sensor data 20 may also include a tire temperature sensor 62 and a tire pressure sensor 64. The road condition and the braking capability of the vehicle may be determined therefrom.

Other system sensors 66 may generate sensor data 20 including steering wheel angle sensor, lateral acceleration sensor, longitudinal acceleration sensor, gyroscopic sensors and other types of sensors.

Vehicle 11 may also have an adaptive cruise control 67. Adaptive cruise control systems are currently becoming available in various vehicles. Such systems include a radar 68 positioned on the front of the vehicle. The radar 68 allows the following vehicle to maintain a predetermined distance from the vehicle in front of it. The present invention expands this technology. As will further be described below, radar 68 may be always on to activate various transponders within its view.

Figure 2:
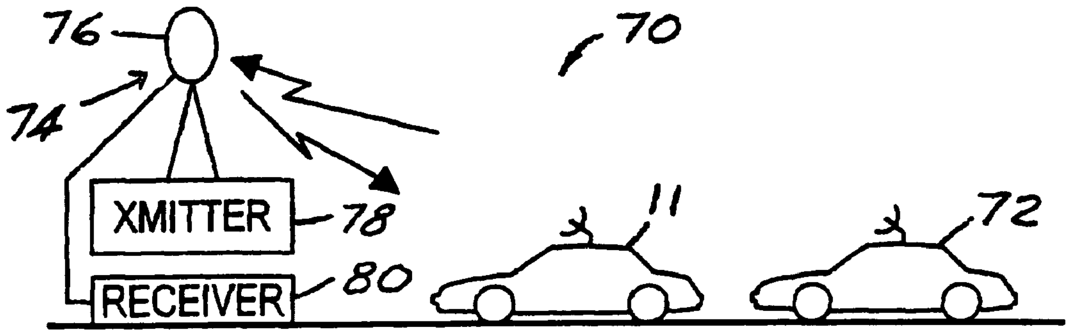
FIG. 2 is a block diagrammatic view of one embodiment of the invention illustrating a vehicle network established by two pre-crash sensing systems.

Referring now to FIG. 2, vehicle 11 may be part of a network 70 in conjunction with a second vehicle or various numbers of vehicles represented by reference numeral 72. Vehicle 72 preferably is configured in a similar manner to that of vehicle 11 shown in FIG. 1. Vehicle 72 may communicate directly with vehicle 11 through transmitter 26 and receiver 22 to form a wireless local area network. The network 70 may also include a repeater 74 through which vehicle 11 and vehicle 72 may communicate. Repeater 74 has an antenna 76 coupled to a transmitter 78 and a receiver 80. Various information can be communicated through network 70. For example, vehicle data, position data, and sensor data may all be transmitted to other vehicles throughout network 70.

Figure 3:
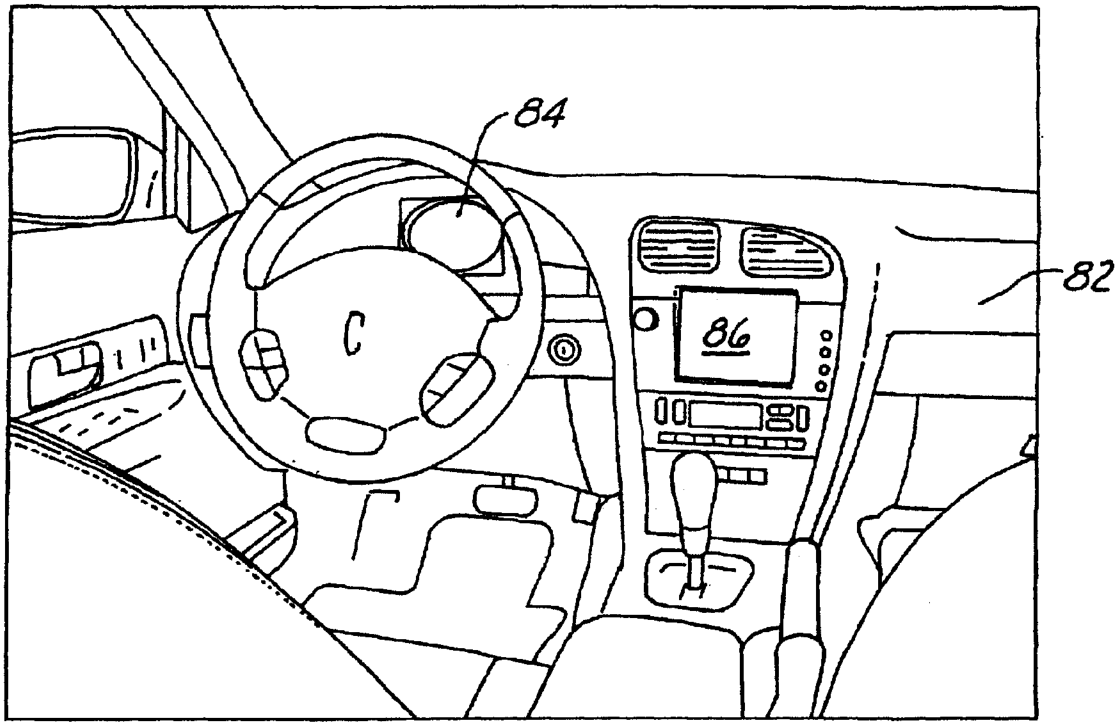
FIG. 3 is a perspective view of an automotive vehicle instrument panel display for use with the present invention.

Referring now to FIG. 3, an instrument panel 82 is illustrated having a first display 84 and a second display 86. Either displays 84, 86 may be used generate various information related to the pre-crash sensing system.

Figure 4:
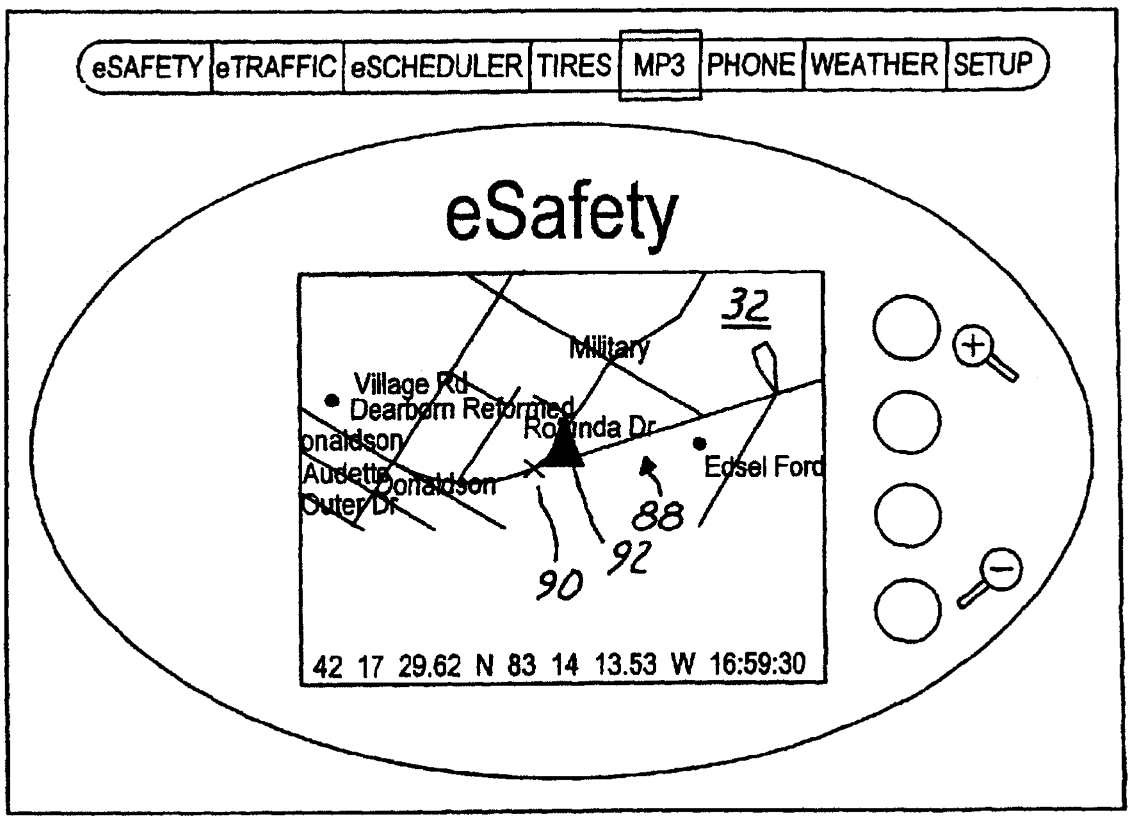
FIG. 4 is a front view of a vehicle network display according to the present invention.

Referring now to FIG. 4, display 84 is illustrated in further detail. Display 84 corresponds to the vehicle network display 32 mentioned above. The vehicle network display 32 may include a map 88, a first vehicle indicator 90, and a second vehicle indicator 92. First vehicle indicator corresponds to the vehicle in which the pre-crash sensing system is while vehicle indicator 92 corresponds to an approaching vehicle. Vehicle network display 32 may be displayed when a vehicle is near but beyond a certain distance or threat level. The vehicles on the display may be those within the field of view or those broadcasting signals as will be described below.

Figure 5:
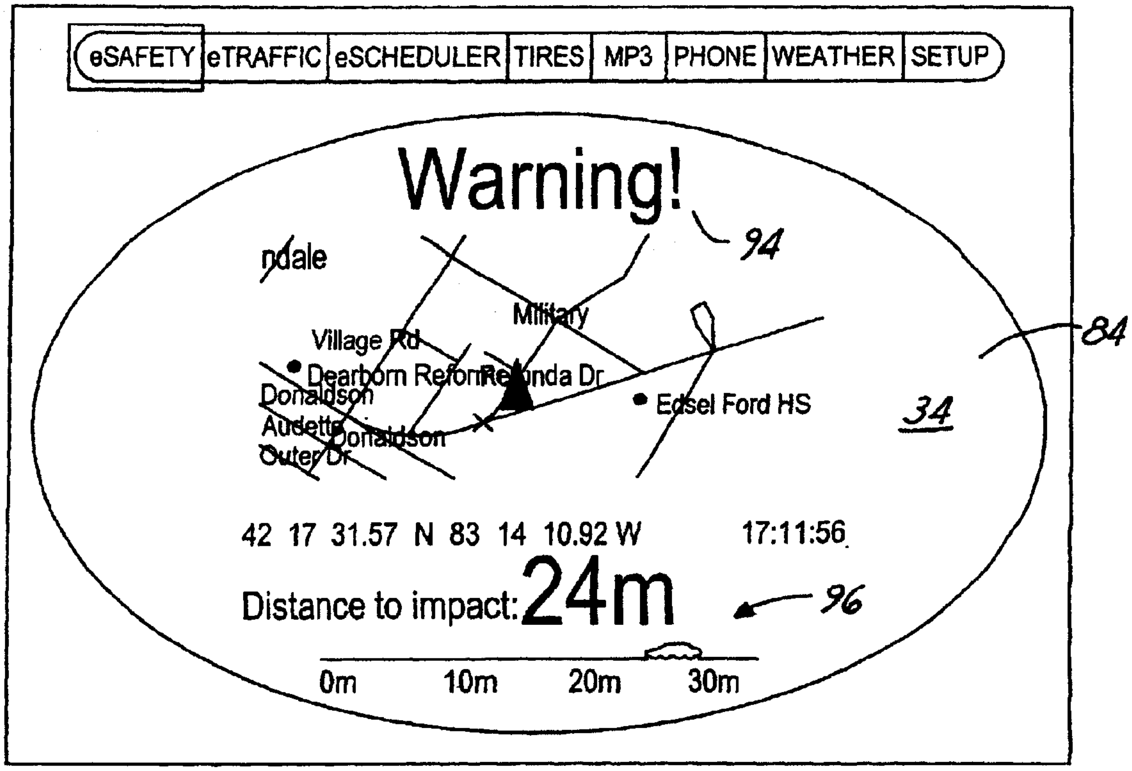
FIG. 5 is a front view of a warning display according to the present invention.

Referring now to FIG. 5, display 84 showing a warning display 34 is illustrated. Warning display 34 in addition to the display information shown in vehicle network display in FIG. 3, includes a warning indicator 94 and a distance indicator 96. Distance indicator 96 provides the vehicle operator with an indication of the distance from a vehicle. The warning display 34 may be indicated when the vehicle is within a predetermined distance or threat level more urgent than that of vehicle network display 32 of FIG. 3.

Figure 6:
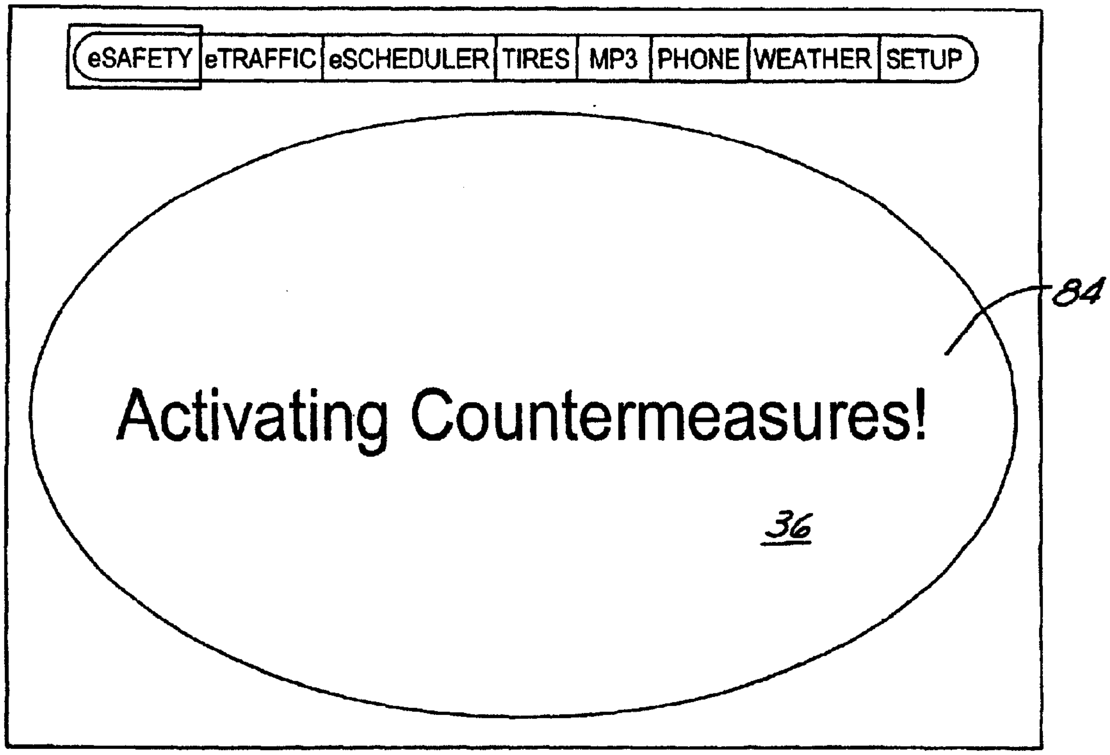
FIG. 6 is a counter-measure display according to the present invention.

Referring now to FIG. 6, vehicle display 84 changes to a counter-measure display 36 to indicate to the vehicle operator that a counter-measure is being activated because the threat level is high or the distance from the vehicle is within a predetermined distance less than the distances needed for activation of displays shown in FIGS. 3 and 4.

Figure 7A:
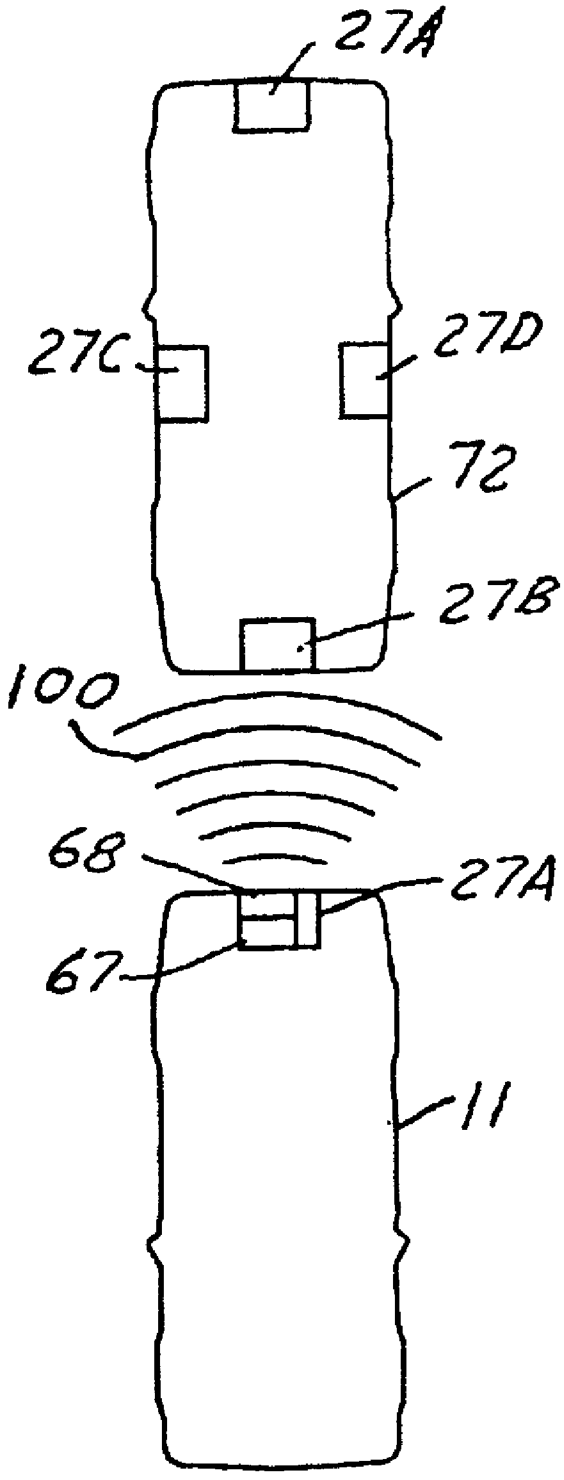
FIGS. 7A, 7B and 7C are plan view of a first and second automobile communicating according to the present invention.

Referring now to FIG. 7, a method for communicating between two vehicles is illustrated. In FIG. 7A, vehicle 11 generates a cruise control signal 100 from radar 68 of adaptive cruise control system 67. The radar signal travels and has a reduced amplitude as the distance from vehicle 68 increases. As is illustrated, the cruise control signal 100 travels to vehicle 72.

Figure 7B:
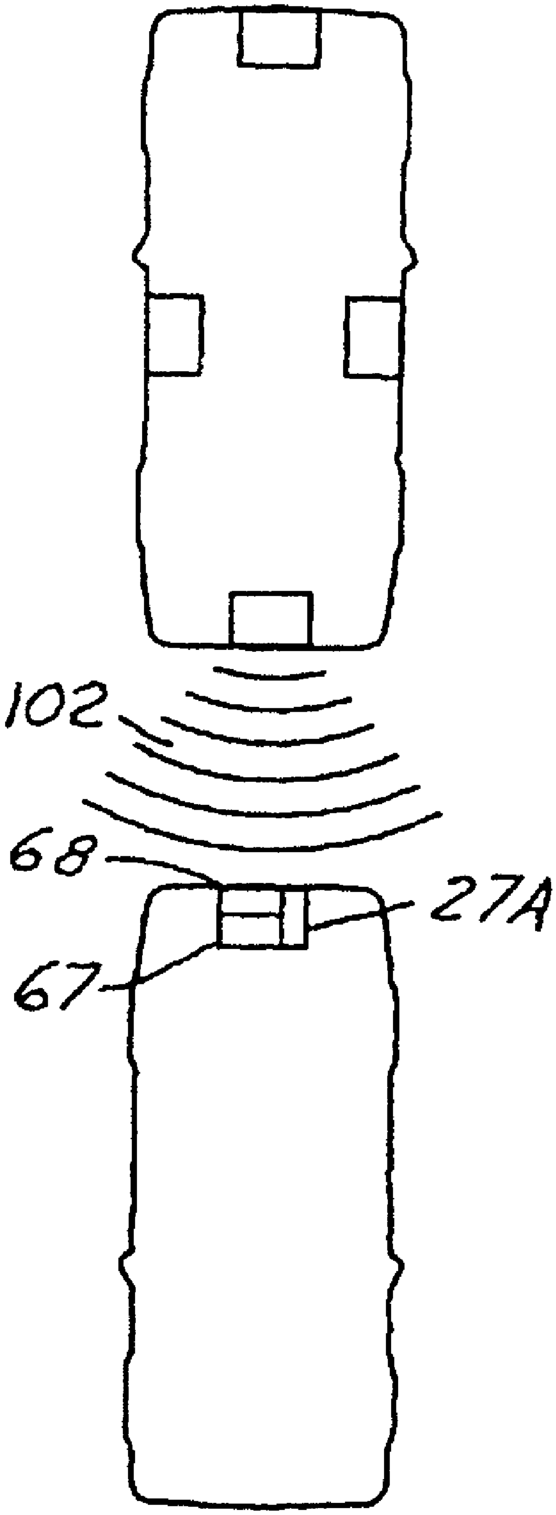

In FIG. 7B, the cruise control signal 1 00 activates the rear transponder 27B which in turns generates a response signal 102. The response signal 102 may provide various information including a communication key by which vehicles 11 and 72 communicate. The response signal 102 is essentially a data signal. Examples of data in response signal 102 include the position of the second vehicle, the type of vehicle, and data from various sensors from the vehicle. The various sensors may include those that are described above in FIG. 1.

Figure 7C:
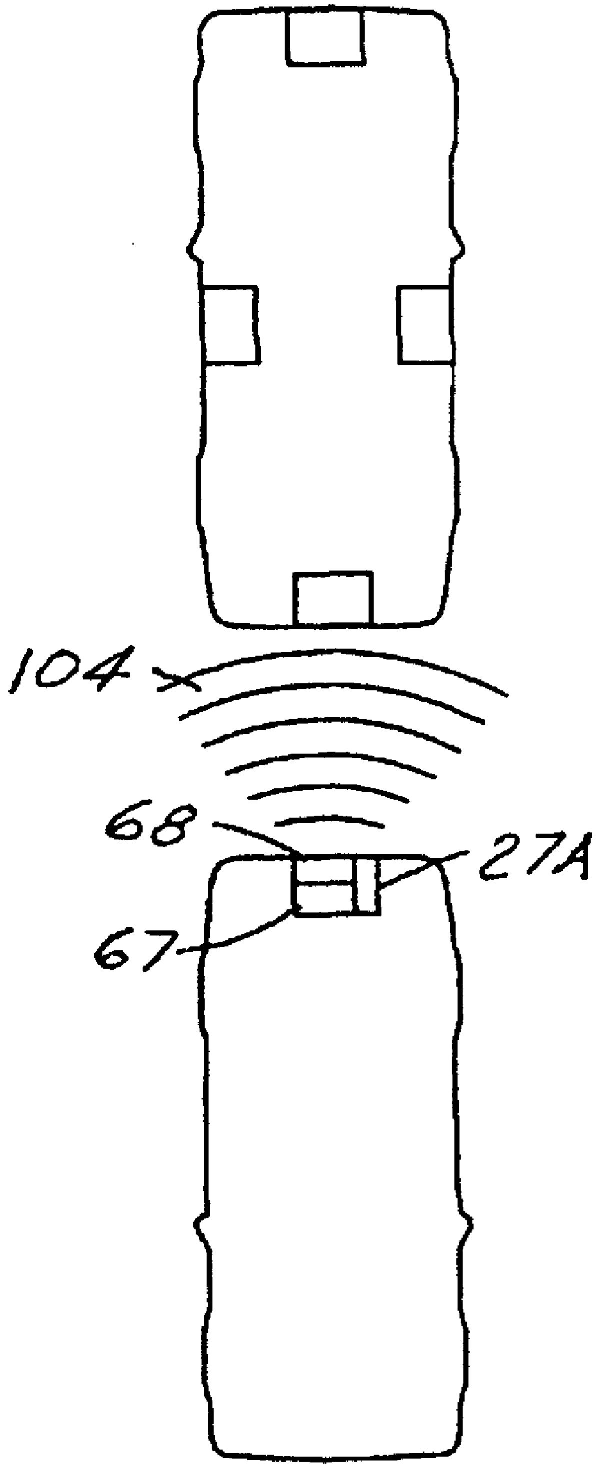

Referring now to FIG. 7C, in response to the response signal 102 vehicle 11 generates a data signal 104 from front transponder 27A. The data signal from front transponder 27A may include similar types of information that is received from vehicle 72. Also, in this process of communication, preferably the global positioning clocks are used to synchronize the communication. That way each of the two vehicles are not communicating at the same time. Likewise, as the distance between the two vehicles decreases, the threat level increases. As the threat level increases communication between the vehicles also preferably increases. That is, once the adaptive cruise control system senses the presence of a second vehicle, and a communication key is exchanged, the vehicles may communicate transponder-to-transponder until the threat subsides.

Figure 8:
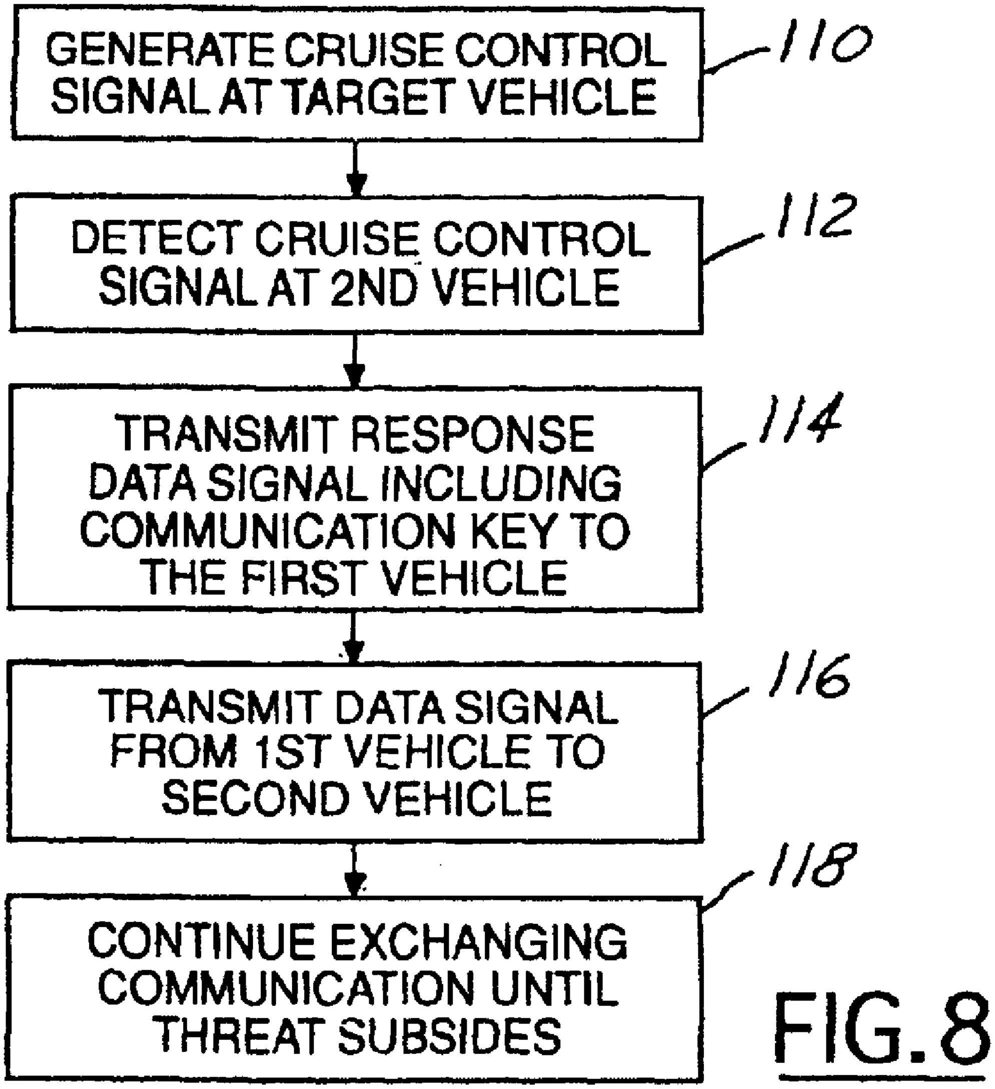
FIG. 8 is a flow chart illustrating the communication method of FIG. 7.

Referring now to FIG. 8, the method illustrated diagrammatically in FIG. 7 is described in further detail. In step 110, the first vehicle generates a cruise control signal at the second vehicle. In step 112, the cruise control signal is detected at the second vehicle. The second vehicle transmits a response data signal including a communication key to the first vehicle in step 114. In step 116 a data signal from the first vehicle is transmitted to the second vehicle. The continuation of exchanging data continues until a threat subsides in step 11 8. As is shown in FIGS. 7 and 8, a first and second mode of transponder is illustrated. That is, a first mode of the transponder actuates the transponder when a radar signal is received thereby. In a second mode exhibited by the first vehicle, the transponder may respond to the presence of another transponder.

Figure 9:
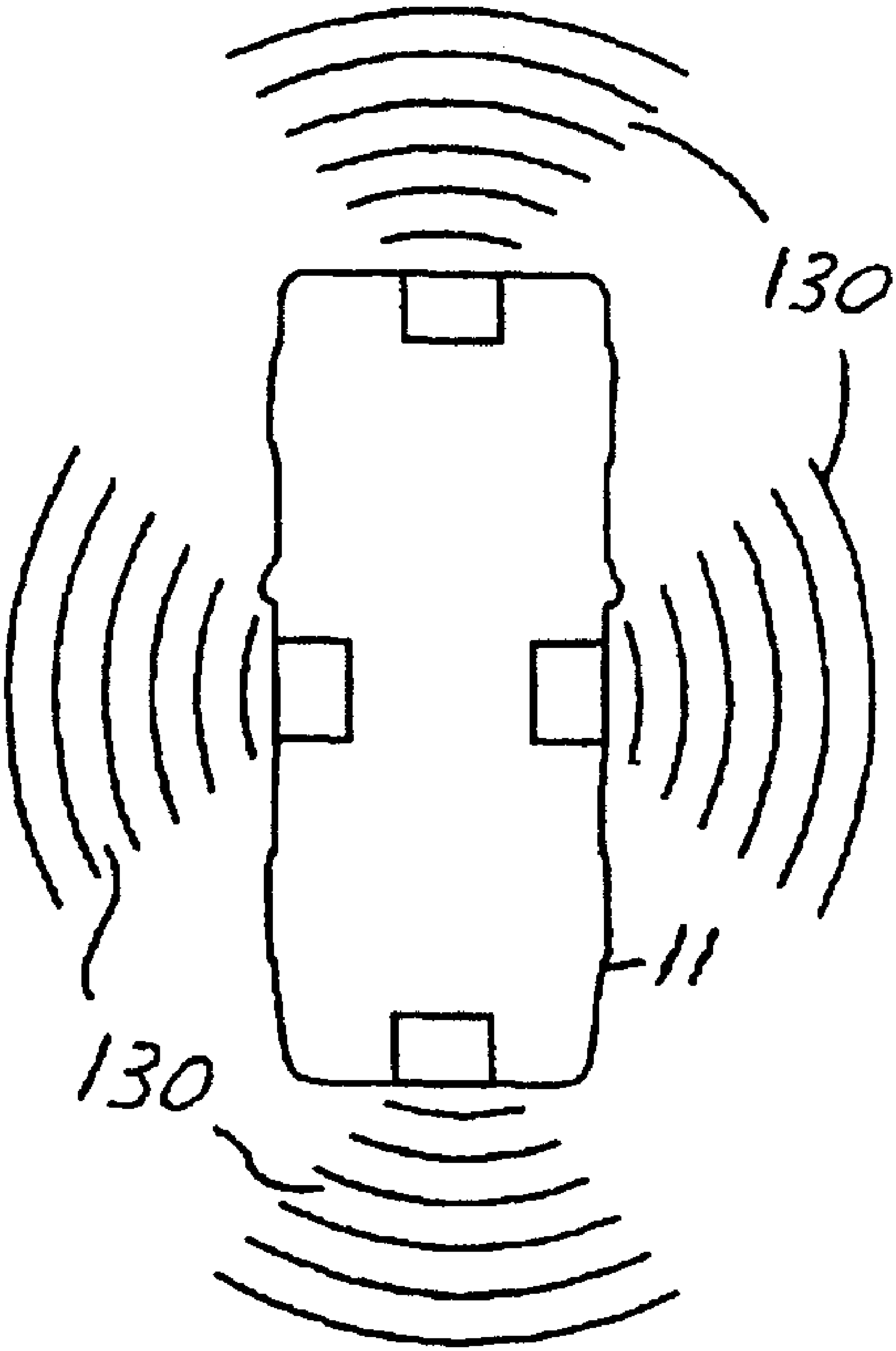
FIG. 9 is a plan view of transponders in a broadcast mode in response to a detected urgent event.

Referring now to FIG. 9, a vehicle exhibiting the third mode of operation of the transponder is illustrated. In this mode an urgent event is sensed at the controller and each of the transponders generates a data signal in response thereto. The urgent event may be sensed by one of the sensors described above in FIG. 1. For example, a sudden longitudinal and lateral deceleration or a sudden application of brakes may trigger the signal. In an urgent situation each of the vehicles within a predetermined range preferably establish a communication link. This will allow other vehicles to be informed of the various vehicle situations therearound.

Figure 10:
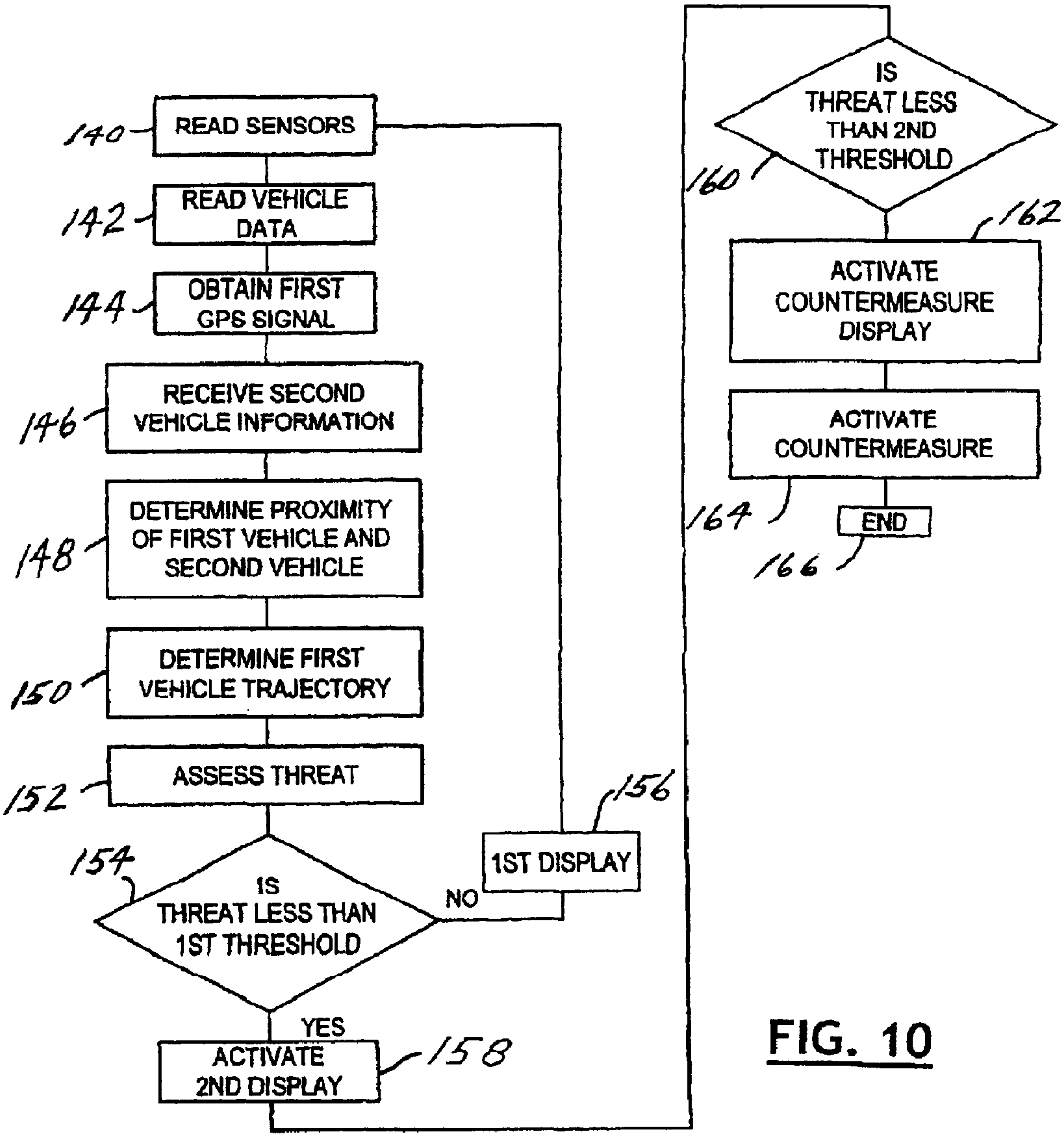
FIG. 10 is a flow chart of the operation of a pre-crash sensing system according to the present invention.

Referring now to FIG. 10, a method for operating the pre-crash sensing system is described. The system is described relative to the first vehicle and a second vehicle. Of course, those skilled in the art will recognize that when a wide area network is established the information from more than one vehicle is considered. In step 140, the various sensors for the system in the first vehicle are read. In step 142, various vehicle data is read. In step 144, a first global positioning signal is obtained for the first vehicle. In step 146, the information from a second vehicle is obtained. The second vehicle information may be various information such as the speed, heading, vehicle type, position, and road conditions from the other vehicles in the network. Also, the side of the second vehicle in front of the first vehicle is known from the transponder signal. That is, the transponder responding to the first vehicle generates a transponder location signal. In step 148, the proximity of the first vehicle and second vehicle is determined. The proximity may be merely a distance calculation. In step 150, the first vehicle trajectory relative to the second vehicle is determined. The first vehicle trajectory uses the information such as the positions and various sensors to predict a path for the first vehicle and the second vehicle. In step 152, the threat of the first vehicle trajectory relative to the second vehicle is determined. For example, when the first vehicle may collide with the second vehicle, a threat may be indicated. The threat is preferably scaled to provide various types of warning to the vehicle. Threat assessment may be made based upon conditions of the vehicle trajectory and vehicle type as well as based upon tire information which may provide indication as to the braking capability of the first vehicle and/or the second vehicle. Thus, the threat level may be adjusted accordingly. Also, the road surface condition may also be factored into the threat assessment. On clear dry roads a threat may not be as imminent as if the vehicle is operating under the same conditions with wet or snowy roads. In the previous blocks, it should be noted that the system is not activated until a vehicle is within a predetermined distance. The threat assessment, it should be noted, is based on a ballistic trajectory such as that described above in FIG. 1. If the threat is not less than a predetermined threshold or the distance is greater than the predetermined threshold, a first display is presented to the driver in step 156. The first display generated in step 156 may, for example, correspond to the vehicle network display shown in FIG. 3. If the threat is less than a first threshold, then a second display such as warning display 34 shown in FIG. 4 may be generated in step 158. Step 158 may for example be presented to the driver when the vehicle is within a predetermined distance from the first vehicle. In step 160, if the threat is not less than a second, threshold step 140 is performed. If the threat is less than a second threshold or the second vehicle is closer to the first vehicle (below the second threshold), then a counter-measure display 36 such as that shown in FIG. 6 may be presented to the vehicle operator in step 162. The counter-measure may also then be activated in step 164. Various counter-measures may include front or side airbag deployment, activating the brakes to lower the front bumper height, steering or braking activations. The activation of the appropriate countermeasure also depends on the transponder position signal received.

As would be evident to those skilled in the art, various permutations and modifications to the above method may be performed. For example, a system in which the road condition and position of the second vehicle may be used to activate a counter-measure system may be employed. Likewise, the second vehicle position relative to the first vehicle and the road condition at the second vehicle may also be displayed to the vehicle operator. Likewise, the threat assessment may also be adjusted according to the road condition.

Another embodiment of the present invention includes activating the countermeasure system in response to the braking capability of surrounding vehicles. By factoring in the braking capability of surrounding vehicles, threat assessment levels may be adjusted accordingly. Likewise, the braking capability of the first vehicle may also be used in the threat assessment level. Likewise, the displays may also be updated based upon the braking capabilities of the nearby vehicles. The braking capabilities may be determined from various tire type, size, tread, tire pressure, tire temperature, outside temperature as well as the road condition.

Advantageously, by connecting the vehicles through the network, various information may be known to drivers of other nearby vehicles. For example, the presence of black ice and other slippery conditions not readily apparent may be transmitted to other vehicles for avoidance thereof.

While particular embodiments of the invention have been shown and described, numerous variations and alternate embodiments will occur to those skilled in the art. Accordingly, it is intended that the invention be limited only in terms of the appended claims.

What is claimed is:

1. A method for operating a pre-crash sensing system for a first vehicle proximate a second vehicle said second vehicle generating a cruise control signal having an amplitude comprising:

detecting the cruise control signal at the first vehicle;

comparing the amplitude to an amplitude threshold;

when the amplitude is greater than the amplitude threshold, generating a vehicle data signal from the first vehicle in response to the cruise control signal.

2. A method as recited in claim 1 wherein generating a vehicle data signal from the first vehicle in response to the cruise control signal comprises activating a transponder in response to the cruise control signal.

3. A method as recited in claim 1 wherein generating a vehicle data signal comprises generating a transponder location relative to the first vehicle.

4. A method as recited in claim 1 further comprising detecting an urgent condition at the first vehicle; generating a first vehicle data signal in response to the urgent condition.

5. A method for operating a pre-crash sensing system for a first vehicle proximate a second vehicle said second vehicle generating a cruise control signal comprising:

detecting the cruise control signal at the first vehicle; and generating a vehicle data signal comprising a first vehicle position signal corresponding to a position of the first vehicle from a global positioning system from the first vehicle in response to the cruise control signal.

6. A method for operating a pre-crash sensing system for a first vehicle proximate a second vehicle said second vehicle generating a cruise control signal comprising:

detecting the cruise control signal at the first vehicle; and generating a vehicle data signal from the first vehicle in response to the cruise control signal, wherein said data signal comprises a vehicle type signal.

7. A method for operating a pre-crash sensing system for a first vehicle proximate a second vehicle comprising:

generating a cruise control signal having an amplitude from the second vehicle;

detecting the cruise control signal at the first vehicle;

comparing the amplitude to an amplitude threshold;

when the amplitude is greater than the amplitude threshold, generating a first vehicle data signal from the first vehicle in response to the cruise control signal.

8. A method as recited in claim 7 further comprising continually broadcasting a transponder transmitter signal from the second vehicle; and, generating the first vehicle data signal from the first vehicle in response to said transmitter transponder signal.

9. A method for operating a pre-crash sensing system for a first vehicle proximate a second vehicle comprising:

generating a cruise control signal from the second vehicle;

detecting the cruise control signal at the first vehicle;

generating a plurality of first vehicle data signals from the first vehicle in response to the cruise control signal at a first broadcast rate between the plurality of vehicle data signals; and increasing the first broadcast rate in response to a relative distance between said first vehicle and said second vehicle.

10. A method for operating a pre-crash sensing system for a first vehicle proximate a second vehicle comprising:

generating a cruise control signal from the second vehicle;

detecting the cruise control signal at the first vehicle;

generating a first vehicle data signal from the first vehicle in response to the cruise control signal;

sensing an urgent event and broadcasting a transponder transmitter signal from the second vehicle in response to the urgent event; and, generating the first vehicle data signal from the first vehicle in response to said transmitter transponder signal.

11. A method for communicating from a first vehicle comprising:

sensing an urgent event at the first vehicle; and forming a first vehicle data signal comprising a transponder location relative to the vehicle from the first vehicle in response to the urgent event; and broadcasting the data signal from the first vehicle.

12. A method as recited in claim 11 wherein broadcasting the vehicle data signal from the first vehicle comprises activating a transponder.

13. A method as recited in claim 11 wherein said data signal comprises a first vehicle position signal.

14. A method as recited in claim 11 wherein said data signal comprises a first position signal.

15. A method for communicating from a first vehicle comprising:

sensing an urgent event at the first vehicle; and forming a first vehicle data signal comprising a vehicle type signal from the first vehicle in response to the urgent event; and broadcasting the data signal from the first vehicle.

16. A vehicle communication system comprising:

a first vehicle having a adaptive cruise control system and a first transponder, said adaptive cruise control system generating a cruise control signal; and a second vehicle having a second transponder activated in response to said cruise control signal when the cruise control signal exceeds a threshold, said second transponder generating a second transponder signal.

17. A system as recited in claim 16 wherein said first transponder receives the second transponder signal and generates a first transponder signal.

* * * * *